US006959433B1

(12) United States Patent
Morales, Jr. et al.

(10) Patent No.: US 6,959,433 B1
(45) Date of Patent: Oct. 25, 2005

(54) DATA PROCESSING SYSTEM, METHOD, AND PROGRAM FOR AUTOMATICALLY TESTING SOFTWARE APPLICATIONS

(75) Inventors: Rene Morales, Jr., Austin, TX (US); Charles Vaughn Rankin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/550,387

(22) Filed: Apr. 14, 2000

(51) Int. Cl.$^7$ ............................................... G06F 9/44
(52) U.S. Cl. ...................... 717/127; 717/101; 717/131; 717/135
(58) Field of Search ............................... 717/100–103, 717/120–135; 703/13–17, 22

(56) References Cited

U.S. PATENT DOCUMENTS

| | | | |
|---|---|---|---|
| 4,970,725 A | 11/1990 | McEnroe et al. | |
| 5,021,997 A | 6/1991 | Archie et al. | |
| 5,136,705 A | 8/1992 | Stubbs et al. | |
| 5,446,652 A | 8/1995 | Peterson et al. | |
| 5,500,941 A | 3/1996 | Gil | |
| 5,544,310 A | 8/1996 | Forman et al. | |
| 5,634,098 A | 5/1997 | Janniro et al. | |
| 5,673,387 A | 9/1997 | Chen et al. | |
| 5,742,754 A | 4/1998 | Tse | |
| 5,758,061 A | 5/1998 | Plum | |
| 5,778,230 A | 7/1998 | Wimble et al. | |
| 5,790,117 A | 8/1998 | Halviatti et al. | |
| 5,862,362 A * | 1/1999 | Somasegar et al. | ............ 703/21 |
| 5,893,128 A | 4/1999 | Nauckhoff | |
| 5,909,544 A | 6/1999 | Anderson, II et al. | |
| 5,910,895 A | 6/1999 | Proskauer et al. | |
| 5,913,023 A | 6/1999 | Szermer | |
| 6,321,347 B1 * | 11/2001 | Beeker et al. | ................. 714/28 |
| 6,687,834 B1 * | 2/2004 | Morales et al. | ............. 713/201 |

FOREIGN PATENT DOCUMENTS

WO     WO 98/57187     12/1998

OTHER PUBLICATIONS

"System Verification Using Multiple Independent Simulation Engines Running Under Common Control," IBM Technical Disclosure Bulletin, vol. 30 No. 1 Jun. 1987, pp. 340-342.

"Software Validation Test Facilitator test scripts," IBM Technical Disclosure Bulletin, vol. 35 No. 4B Sep. 1992, pp. 212-215.

"Automated Code Checker," IBM Technical Disclosure Bulletin, vol. 36 No 09B Sep. 1993, pp. 239-240.

(Continued)

*Primary Examiner*—Ted T. Vo
(74) *Attorney, Agent, or Firm*—Marilyn Smith Dawkins; Dillon & Yudell LLP

(57) ABSTRACT

A data processing system, method, and program including an automated software test environment are disclosed for automatically testing a software application. A work flow manager is established for automatically managing the automated software test environment. The automated software test environment includes multiple computer systems coupled to a server computer system utilizing a network. The work flow manager is executed utilizing the server computer system. Multiple ordered test phases are established. At least each of two of the order test phases are executed utilizing different ones of the computer systems. An event is transmitted to the work flow manager utilizing one of the computer systems to start execution of selected ones of the ordered test phases. The work flow manager controls execution of the selected ordered test phases in response to the receipt of events.

78 Claims, 11 Drawing Sheets

OTHER PUBLICATIONS

"Functional Test Case Identification in an Object-Oriented Environment using Matrix Progression Techniques," IBM Technical Disclosure Bulletin, vol. 37 No. 01 Jan. 1994, pp. 503-505.

"Error Detection/Fault Isolation in VHDL," IBM Technical Disclosure Bulletin, vol. 39 No. 03 Mar. 1996, p. 27.

"Advanced Computer System Evaluation Architecture," IBM Technical Disclosure Bulletin, vol. 37 No. 10 Oct. 1994, pp. 467-468.

"Method of Controlling Development Phases of Computer Software," IBM Technical Disclosure Bulletin, vol. 33 No. 1B Jun. 1990, pp. 114-116.

"Functional Test Case Identification in an Object-Oriented Environment using Matrix Progression Techniques," IBM Technical Disclosure Bulletin, vol. 37 No. 01 Jan. 1994, pp. 503-505.

"Defect Isolation," IBM Technical Disclosure Bulletin, vol. 37 No. 04A Apr. 1994, pp. 239-240.

"Non-Invasive Automation of Software Test With Shared Peripherals," IBM Technical Disclosure Bulletin, vol. 35 No. 2 Jul. 1992, p. 230-232.

"System and Method For Portable Server-Based Active Process Flow Software Components," Research Disclosure, Apr. 1999, p. 567.

"Software Test Coverage Measurement," IBM Technical Disclosure Bulletin, vol. 39, No. 08, Aug. 1996, pp. 223-225.

* cited by examiner

```
PROCESS
    NAME InstallOS
    COMMAND install.exe
    .... (other data) ....
END PROCESS GROUP
    EXE PARALLEL
    NAME RunTests PROCESS
        NAME RunXYZTest
        COMMAND XYZ.exe
        .... (other data) ....
    END PROCESS GROUP
        EXE SERIES
        NAME RunABC PROCESS
            NAME RunABCTest
            COMMAND ABC.exe
            .... (other data) ....
        END PROCESS
            NAME CleanUpABCFiles
            COMMAND cleanABC.exe
            .... (other data) ....
        END
    END    /* end RunABC Group */
END        /* end RunTests Group */

PROCESS
    NAME CollectLogs
    COMMAND getLogs.exe
    .... (other data) ....
END
```

*Fig. 11*

EXECUTION TIME LINE
─────────────────────────────────────────────

(RunTests Group)
InstallOS--->    RunXYxTest-------------------------->

(RunABC Group)                  Collectlogs--->
     RunABCTest------------->CleanUpABCFiles------------>

*Fig. 12*

DATA PROCESSING SYSTEM, METHOD, AND PROGRAM FOR AUTOMATICALLY TESTING SOFTWARE APPLICATIONS

CROSS-REFERENCE TO RELATED APPLICATIONS

The present invention is related to the subject matter of patent application Ser. No. 09/550,386, now U.S. Pat. No. 6,687,834 entitled "DATA PROCESSING SYSTEM, METHOD, AND PROGRAM FOR GENERATING A JOB WITHIN AN AUTOMATED TEST ENVIRONMENT", assigned to the assignee herein named, filed on Apr. 14, 2000, and incorporated herein by reference.

BACKGROUND OF THE INVENTION

1. Technical Field

The present invention relates in general to data processing systems and, in particular, to a data processing system, method, and program for automatically testing software applications. Still more particularly, the present invention relates to a data processing system, method, and program for automatically testing software applications utilizing an event-driven work flow manager which controls a plurality of ordered test phases executed utilizing a plurality of computers coupled together via a network.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, and Aptiva series.

An important part of software development is testing whether a particular software application functions as intended and without encountering errors. Typically, a large number of tests will be repeatedly executed on the software application. In order to perform these tests efficiently, a variety of software testing devices have been disclosed. These devices typically describe a testing method to be executed utilizing a single computer system which is also executing the software application being tested. The computer system will include the necessary test cases, any applications needed to execute the test cases, and all other necessary hardware or software components.

A tester who desires to execute the tests must oversee and control the testing environment. The tester is required to define the test cases, identify the computer system to execute the test cases, indicate to the computer system when a particular portion of the test should start executing, when a portion of the test has completed and when to begin executing the next portion of the test. Although the computer system will automatically execute the tests, the tester must manually control the execution of the tests.

SUMMARY OF THE INVENTION

A data processing system, method, and program including an automated software test environment are disclosed for automatically testing a software application. A work flow manager is established for automatically managing the automated software test environment. The automated software test environment includes multiple computer systems coupled to a server computer system utilizing a network. The work flow manager is executed utilizing the server computer system. Multiple ordered test phases are established. At least each of two of the order test phases are executed utilizing different ones of the computer systems. An event is transmitted to the work flow manager utilizing one of the computer system to start execution of selected ones of the ordered test phases. The work flow manager controls execution of the selected ordered test phases in response to the receipt of events.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 11 depicts pseudo-code which provides an example of the execution of processes in serial, in parallel, and in a combination of serial and parallel processes in accordance with the present invention; and FIG. 12 illustrates an execution time line depicting the execution of the processes of FIG. 11 in accordance with the present invention.

DETAILED DESCRIPTION OF PREFERRED EMBODIMENT

Figure 1:
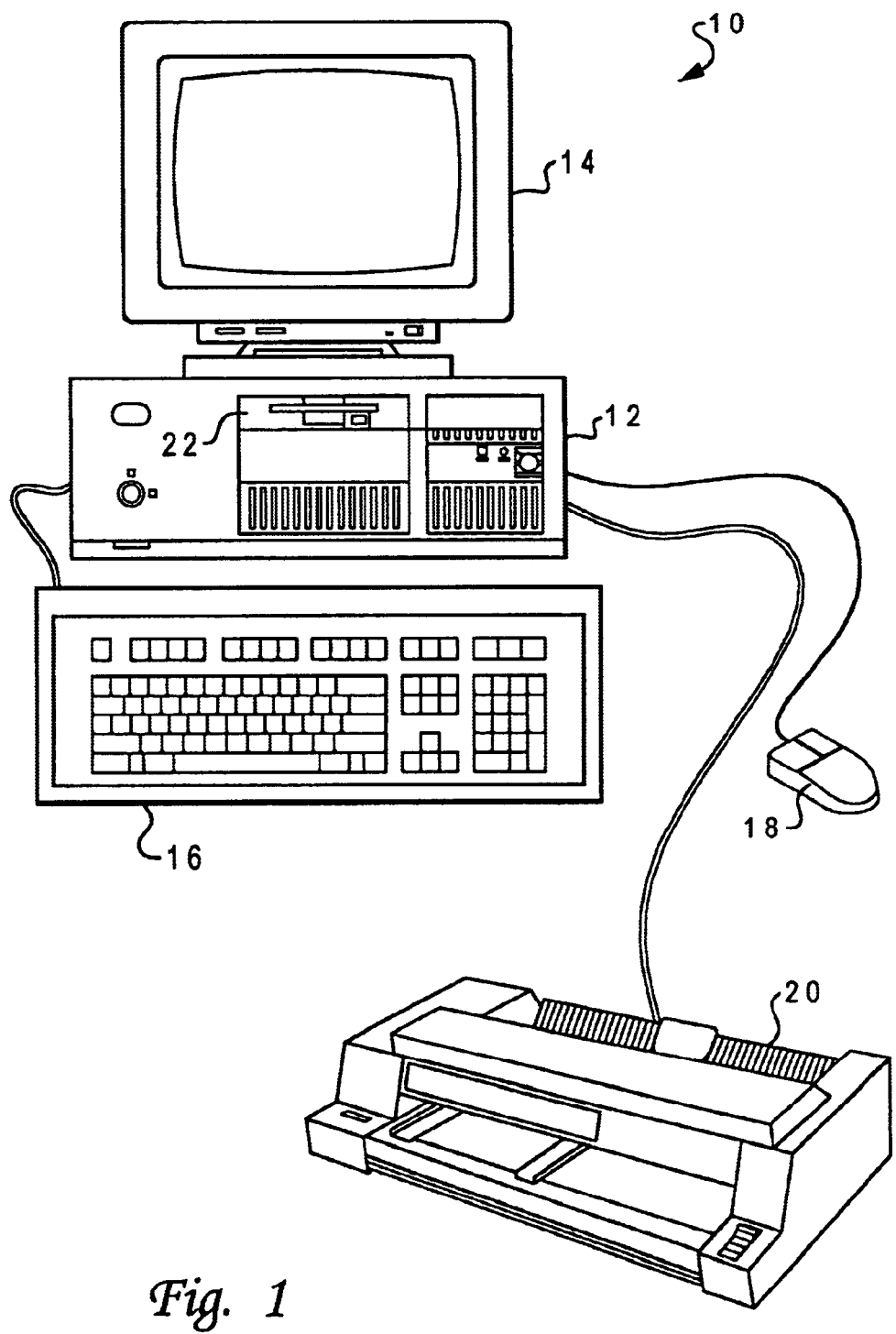
FIG. 1 depicts an illustrative embodiment of a data processing system with which the present invention may advantageously be utilized.

A data processing system, method, and program are described for automatically testing software applications. A work flow manager is established for automatically managing the automated software test environment. The automated software test environment includes a plurality of computer systems coupled to a server computer system utilizing a network. The work flow manager is executed utilizing the server computer system.

The work flow manager accepts job definitions, waits for events external to the work flow manager in response to which the work flow manager controls the execution of selected ones of the ordered test phases, executes the jobs based on test machine availability and priority, provides job management facilities for a tester, logs execution results, and notifies testers upon test failure. Once a tester submits a job to the work flow manager, the work flow manager automatically executes the test phases to complete the job. The work flow manager will automatically execute the test phases upon the availability of the test machines. When the job is complete, the work flow manager will report the results to the tester.

The automated software test environment includes a server computer system executing the work flow manager and a plurality of computer systems. The ordered test phases are executed on the computer systems. Preferably, the test phase execution is divided among the computer systems such that one or more computers will execute a test phase. For example, multiple computer systems may be utilized to build a software application while different, multiple computer systems may be utilized to execute tests.

The work flow manager automatically controls the execution of the plurality of ordered test phases without the need for manual intervention. The test phases include an initialization (INIT) phase, an installation (INSTALL) phase, an execution (EXE) phase, and a termination (TERM) phase.

During the initialization phase, the computer systems which are to be utilized as test machines are prepared to execute the tests. The test machines may be prepared prior to the availability of a built version of the software application to test. Before the initialization phase, the software application that is to be tested is built. During the initialization test phase, it is copied to a public computer system such that the built application may be accessed by the work flow manager. During the installation test phase, the software application to be tested is copied to the test machine(s) which will execute the tests. Additional software routines and data necessary to execute the tests are also copied to the test machines during the installation phase. During the execution test phase, the tests are executed on the software application. The termination test phase, thereafter, resets the test machines to their original states by cleaning up the processes which were executed in order to execute the tests, collecting test logs, uninstalling applications, deleting files, and re-booting the test machines to their original states. During all phases, the executed processes are validated by a validation procedure described below.

The work flow manager is event driven. For the initialization test phase and the installation test phase, an event is transmitted to the work flow manager from a computer system external to the work flow manager which is executing initialization and installation processes. The work flow manager controls execution of the ordered test phases in response to the receipt of these events.

FIG. 1 illustrates a pictorial representation of a data processing system 10 in accordance with the present invention. Computer system 10 includes a computer 12, a monitor 14, a keyboard 16, a mouse 18, a plotter 20, a printer 21, and a floppy drive 22. Computer system 10 may be implemented utilizing any commercially available computer system which has been suitably programmed and which has been modified as described below. Computer system 10 is capable of receiving a variety of different types of inputs from a variety of different types of input devices. Keyboard 16 and mouse 18 are two such types of input devices.

Figure 2:
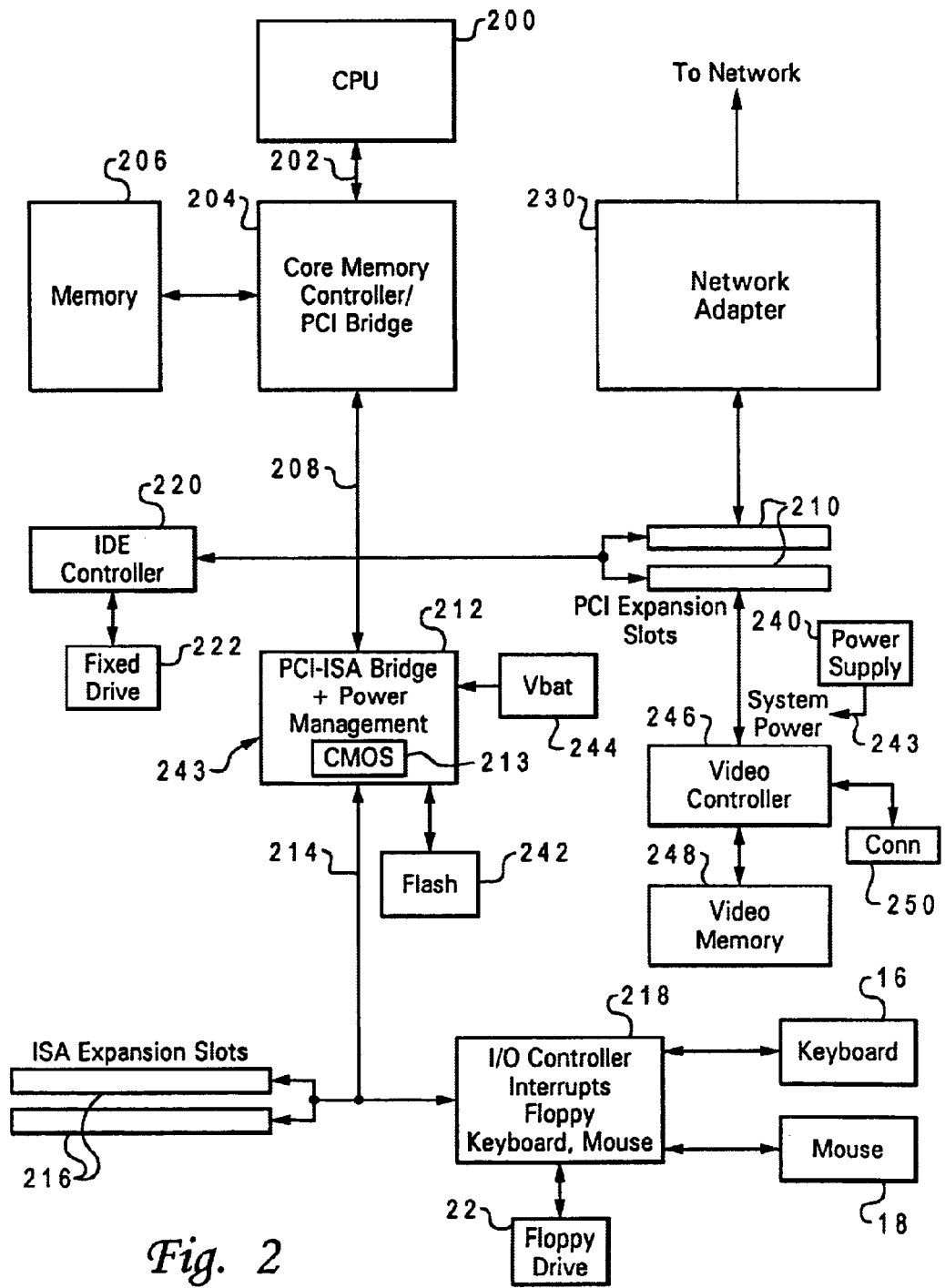
FIG. 2 illustrates a more detailed pictorial representation of the computer system of FIG. 1 in accordance with the present invention.

FIG. 2 depicts a more detailed pictorial representation of the computer system of FIG. 1 in accordance with the present invention. Computer system 12 includes a planar (also commonly called a motherboard or system board) which is mounted within computer 12 and provides a means for mounting and electrically interconnecting various components of computer 12 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices, such as a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as keyboard 16, mouse 18, and floppy drive 22 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer 12 includes a video controller 246 which may, for example, be plugged into one of PCI expansion slots 210. Video controller 246 is connected to video memory 248. The image in video memory 248 is read by controller 246 and displayed on monitor 14 which is connected to computer 12 through connector 250.

Computer 12 includes a power supply 240 which supplies full normal system power 243.

Computer 12 also includes a network adapter 230. Network adapter 230 may be plugged into one of the PCI connector slots 210 (as illustrated) or one of the ISA connector slots 216 in order to permit computer 12 to communicate with a network.

Figure 3:
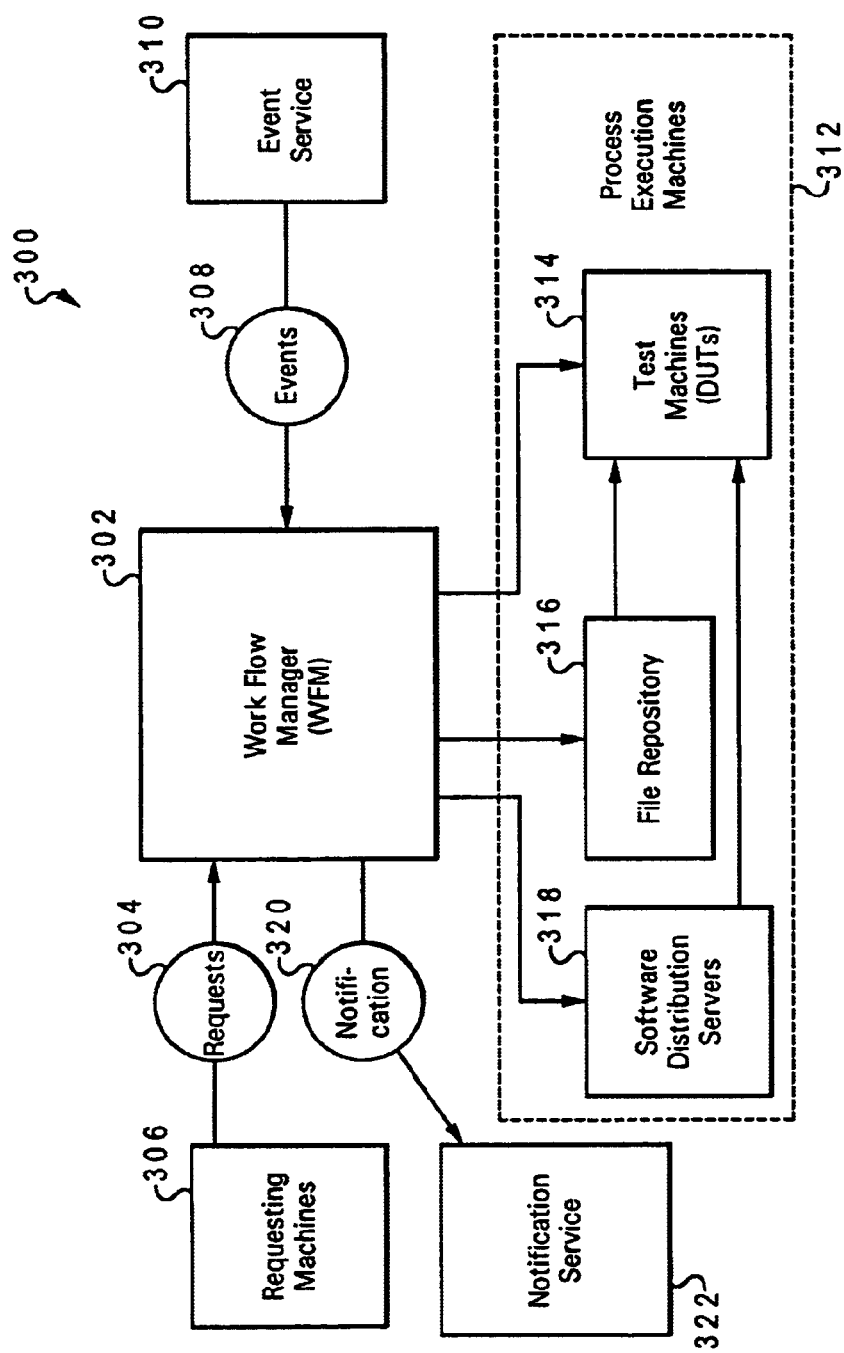
FIG. 3 is a high level block diagram which depicts an automated software test environment in accordance with the present invention.

FIG. 3 is a high level block diagram which depicts an automated software test environment 300 in accordance with the present invention. Automated software test environment 300 includes multiple computer systems, such as depicted in FIGS. 1 and 2, coupled together utilizing a network. Automated software test environment 300 includes a work flow manager 302 which coordinates all aspects of the automated testing of a software application. Work flow manager 302 receives requests 304 from requesting computer systems, i.e. requesting machines 306. Examples of such requests include a query to return information about a job, a request to hold a job, or a submission of a job definition. An event service 310 generates events 308, such as INIT events and INSTALL events as described below, to indicate to the work flow manager the start of one of the test phases.

Work flow manager 302 controls operation of multiple process execution machines 312. Process execution machines 312 include computer systems selected to be test machines 314 (also called "DUTs", device-under-test) executing the software application under test, a file repository 316, and software distribution servers 318. File repository 316 stores test case files and other files necessary for test machines 314 to execute the required tests. Software distribution servers 318 are utilized to store applications which might be needed in test machines 314 in order to execute the tests. The present invention permits the sharing of machines across jobs.

The selection of machines to be used as test machines may be made explicitly by identifying particular machines, or may be made by specifying machine characteristics. For example, a tester might specify a test machine by specifying a processor speed and type, as well as other information. Further, a database might maintain the characteristics for each machine which could be specified as a test machine. Therefore, a database query could be constructed to obtain each machine which has the characteristics specified by the testers.

Work flow manager 302 provides a notification 320 to a notification service 322 in response to the operation of the process execution machines 312. Notification 320 may be one of several different types of notifications. For example, notification service 322 may be notified that execution of the test cases for the software application under test completed execution, the execution of the test cases for the software application under test did not complete execution, and/or the results of the various test cases did not pass validation.

Figure 4:
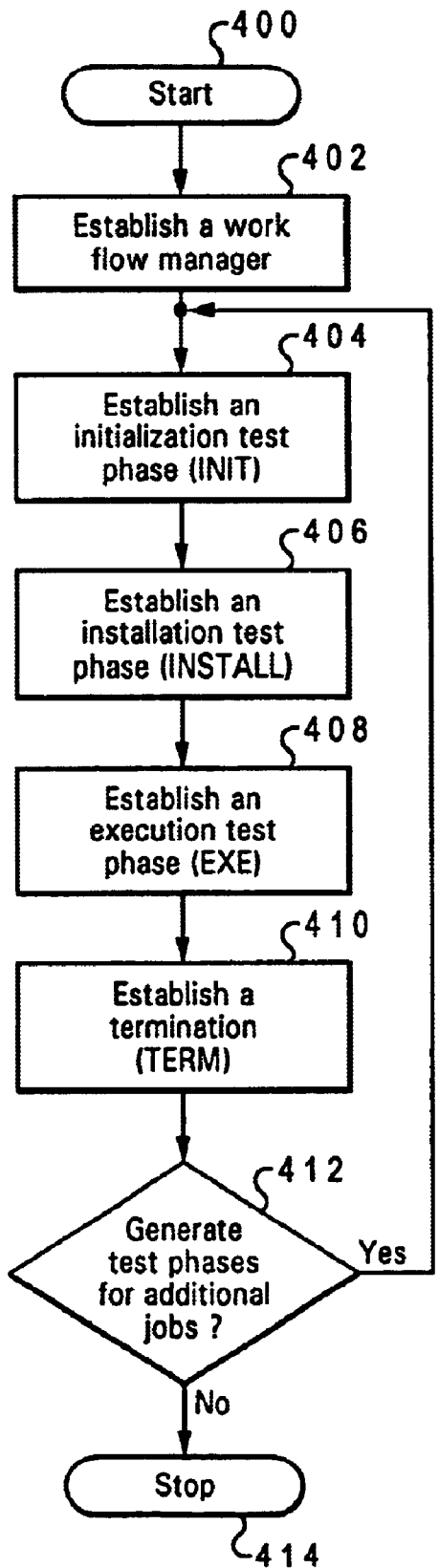
FIG. 4 depicts a high level flow chart which illustrates establishing an automated software test environment including a work flow manager in accordance with the present invention.

FIG. 4 depicts a high level flow chart which illustrates establishing an automated software test environment including a work flow manager, and establishing a plurality of test phases for each job to be executed by the work flow manager in accordance with the present invention. The process starts as depicted by block 400 and thereafter passes to block 402 which illustrates establishing a work flow manager. Next, block 402 depicts establishing an initialization (INIT) phase of testing. Thereafter, block 406 depicts establishing an installation (INSTALL) phase of testing. Block 408, then, illustrates establishing an execution (EXE) phase of testing. Next, block 410 depicts establishing a termination (TERM) phase of testing. Thereafter, block 412 illustrates a determination of whether or not to generate test phases for additional jobs. If a determination is made that test phases for additional jobs should be generated, the process passes back to block 404. Referring again to block 412, if a determination is made that test phases for additional jobs are not to be generated, the process terminates as depicted by block 414.

Figure 5:
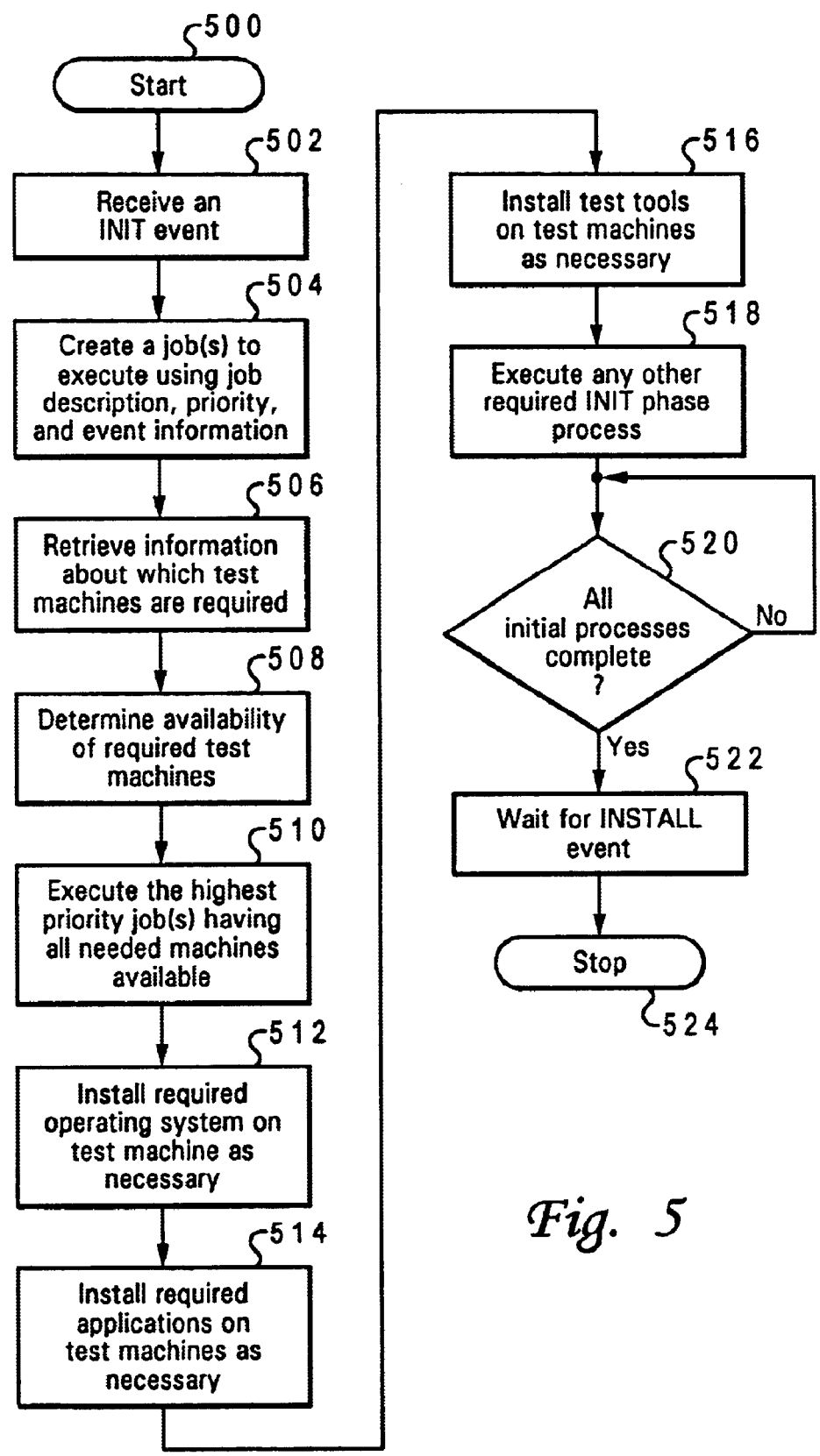
FIG. 5 illustrates a high level flow chart which depicts an initialization test phase of an automated software test environment in accordance with the present invention.

FIG. 5 illustrates a high level flow chart which depicts an initialization phase of an automated software test environment in accordance with the present invention. The process starts as depicted by block 500 and thereafter passes to block 502 which illustrates receiving an initialization event (INIT). The process passes to block 504 which depicts the creation of a job, or jobs, to execute using a job description, priority, and event information. Next, block 506 depicts the work flow manager retrieving information about which test machines are required. The information includes job priority information. Block 508, then, depicts the work flow manager determining the availability of the required test machines. The process then passes to block 510 which illustrates the execution of the job, or jobs, having the highest priority for which all of the needed test machines are available. Thereafter, block 512 depicts the installation of the operating system required to execute the automated test as necessary. Thereafter, block 514 depicts the installation of the required applications on the test machines as necessary. For example, these applications may include other software required to test interoperability, or software required to test whether the application under test can coexist with other software.

The process then passes to block 516 which illustrates the installation of necessary test tools on the test machines. Next, block 518 depicts the execution of any other required initialization phase processes. Thereafter, block 520 illustrates a determination of whether or not all initialization processes described above with reference to FIG. 5 and any other initialization processes have been completed. If a determination is made that not all initialization processes have been completed, the process passes back to block 520. Referring again to block 520, if a determination is made that all initialization processes have been completed, the process passes to block 522 which illustrates a generation of an INSTALL event. The process then terminates as depicted by block 524.

Figure 6:
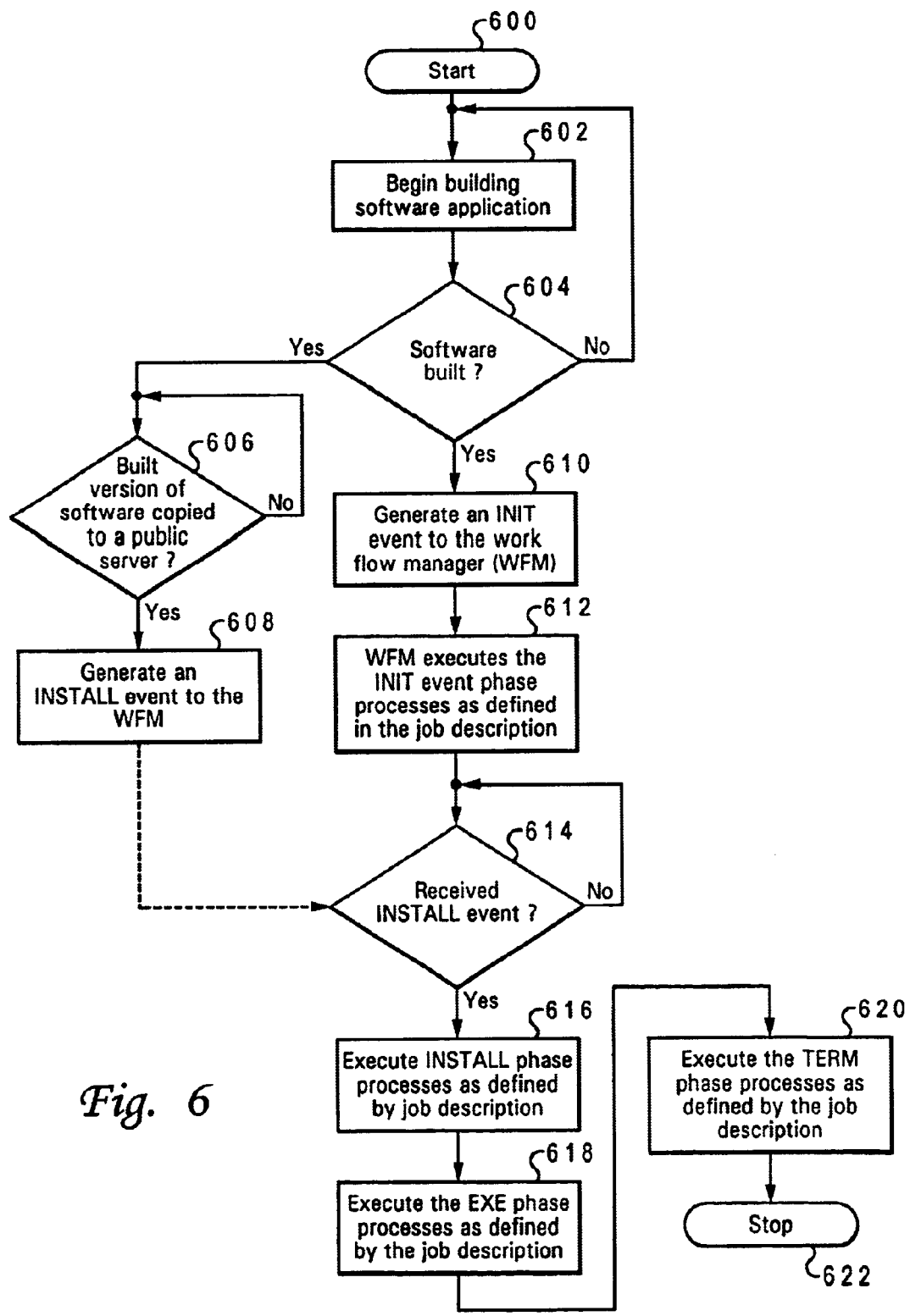
FIG. 6 depicts a high level flow chart which illustrates a generation of INIT and INSTALL events and a work flow manager managing the execution of ordered test phases in accordance with the present invention.

FIG. 6 depicts a high level flow chart which illustrates a generation of INIT and INSTALL events and a work flow manager managing the execution of ordered test phases in accordance with the present invention. The process starts as depicted by block 600 and thereafter passes to block 602 which illustrates the building of a software application. The process then passes to block 604 which depicts a determination of whether or not the build process for this software application under test has been completed. If a determination is made that the build process for this software application under test has not been completed, the process passes back to block 602. A software application is ready to be built once the code for the application is written and the code is ready to be compiled. Referring again to block 604, if a determination is made that the build process for this software application under test has been completed, the process passes simultaneously to both block 606 and block 610. In this manner, the work flow manager is capable of executing initialization processes, such as test machine set up, while the software to be tested is being built and propagated to public computer systems.

Block 606 depicts a determination of whether or not the built version of the software application has been copied to a public computer system. If a determination is made that the built version of the software application has not been copied to a public computer system, the process passes back to block 606. Referring again to block 606, if a determination is made that the built version of the software application has been copied to a public computer system, the process passes to block 608 which illustrates the generation of an INSTALL event to the work flow manager.

Block 610 illustrates the generation of an INIT event to the work flow manager. Next, block 612 depicts the work flow manager (WFM) executing the INIT event phase processes as defined in the job description. Thereafter, block 614 illustrates a determination of whether or not an INSTALL event was received by the work flow manager. If a determination is made that an INSTALL event was not received, the process passes back to block 614. Referring again to block 614, if a determination is made that an INSTALL event was received by the work flow manager, the process passes to block 616 which depicts the work flow manager executing the INSTALL test phase processes as defined by the job description. Thereafter, block 618 illustrates the work flow manager executing the execution (EXE) test phase processes as defined by the job description. Next, block 620 illustrates the work flow manager executing the termination (TERM) test phase processes as defined by the job description. The process then terminates as depicted by block 622.

Figure 7:
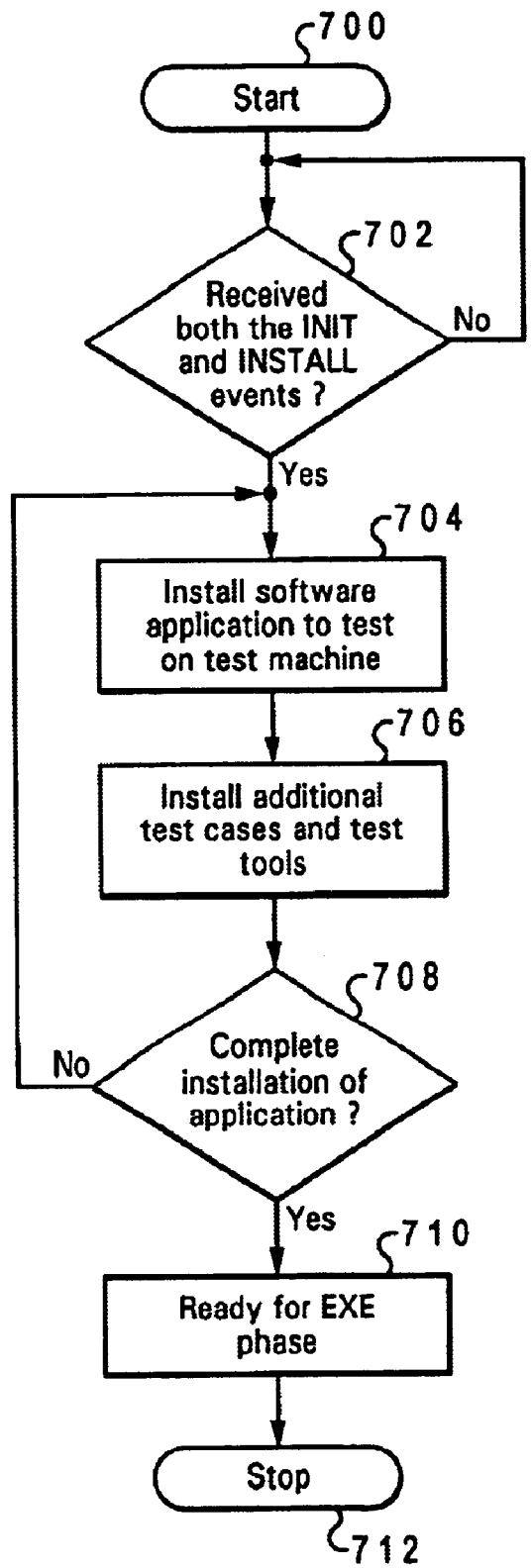
FIG. 7 illustrates a high level flow chart which depicts an installation test phase of an automated software test environment in accordance with the present invention.

FIG. 7 illustrates a high level flow chart which depicts an installation phase of an automated software test environment in accordance with the present invention. The process starts as depicted by block 700 and thereafter passes to block 702 which illustrates a determination of whether or not the work flow manager has received both an INIT event and an INSTALL event for the software application under test. If a determination is made that the work flow manager has not received both of these events for the software application under test, the process passes back to block 702.

Referring again to block 702, if a determination is made that the work flow manager has received both the INIT and INSTALL events for the software application under test, the process passes to block 704 which depicts the work flow manager installing the software application to be tested on the computer system(s) selected to be the test machine(s). Next, block 706 illustrates the installation of the additional tools and test cases. The test cases are either custom built routines and/or generally available test applications used to test the software application. The process then passes to block 708 which depicts a determination of whether or not the installation phase for the software application has been completed. If a determination is made that installation phase for the software application has not been completed, the process passes back to block 704. Referring again to block 708, if a determination is made that installation phase for the software application has been completed, the process passes to block 710 which illustrates the work flow manager being ready for the execution test phase. The process then terminates as depicted by block 712.

Figure 8:
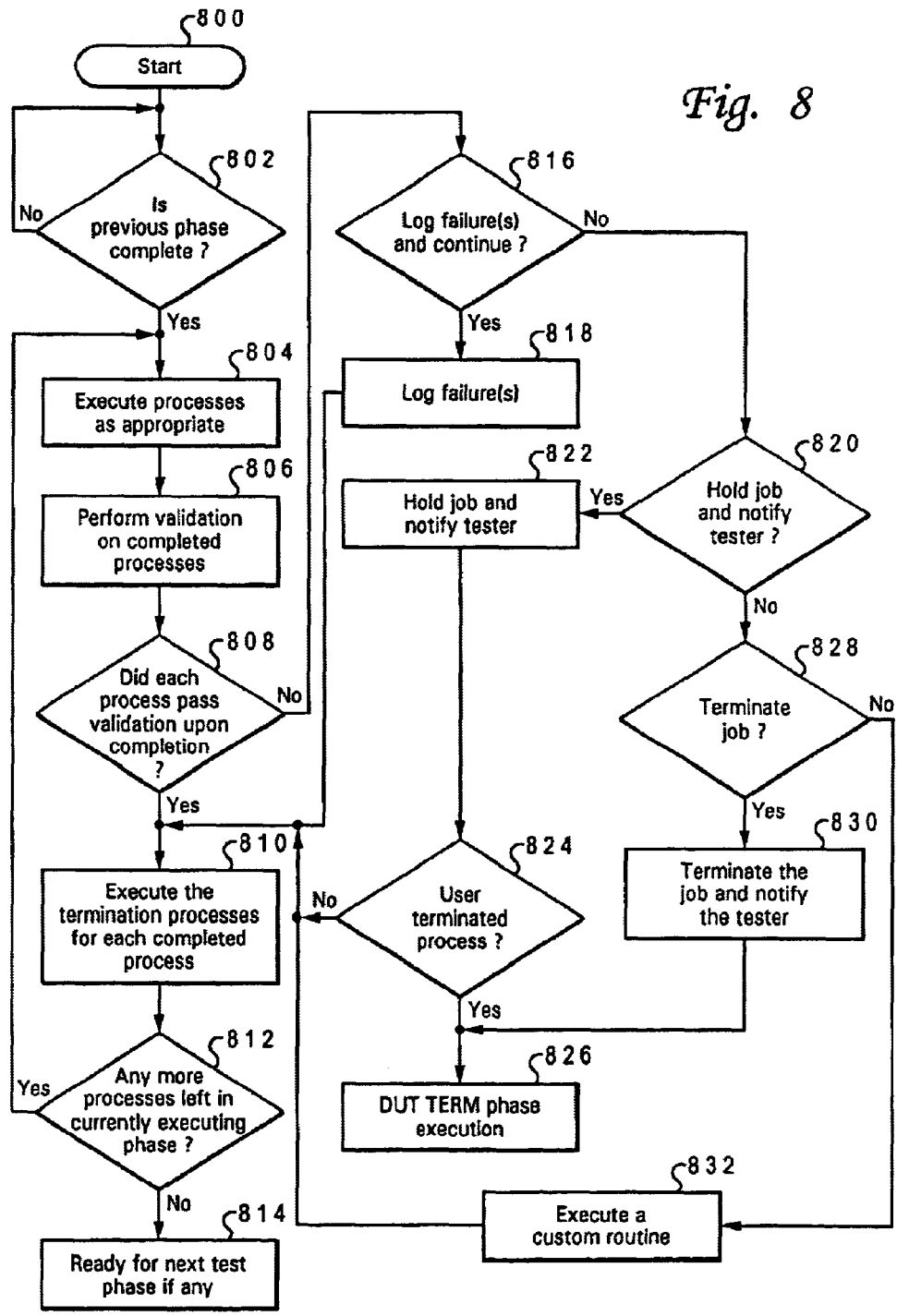
FIG. 8 illustrates a high level flow chart which depicts the execution procedure for all processes executed within an automated software test environment in accordance with the present invention.

FIG. 8 illustrates a high level flow chart which depicts the execution procedure for all processes executed within an automated software test environment in accordance with the present invention. The process starts as depicted by block 800 and thereafter passes to block 802 which illustrates a determination of whether or not the work flow manager has completed execution of the previous test phase. If a determination is made that the work flow manager has not completed execution of the previous phase, the process passes back to block 802. Referring again to block 802, if a determination is made that the work flow manager has completed execution of the previous phase, the process passes to block 804 which depicts the work flow manager executing processes as defined by the job or jobs. Thereafter, block 806 illustrates performing a validation process on all of the completed processes. Next, block 808 depicts a determination of whether or not each of the completed processes passed the validation process. For each of the completed processes, if a determination is made that the process passed the validation process, the process passes to block 810 which illustrates the execution of the termination processes for each of the completed processes. For each process, one or more termination processes will be executed when the process has been completed in order to reset the test machines to an original state.

Thereafter, block 812 depicts a determination of whether or not there are any processes left executing. If a determination is made that there are more processes executing, the process passes back to block 804. Referring again to block 812, if a determination is made that no more processes are executing, the process passes to block 814 which depicts the work flow manager being ready for the next test phase, if any.

Referring again to block 808, for each of the completed processes, if a determination is made that the process did not pass validation, the process passes to block 816 which illustrates a determination of whether or not to log the test process failure and continue processing the job. If a determination is made to log the test process failure and continue processing the job, the process passes to block 818 which depicts logging the test process failure. The process then passes to block 810.

Referring again to block 816, if a determination is made not to log the test process failure and continue processing the job, the process passes to block 820 which depicts a determination of whether or not to hold the job and notify the tester of the failure. If a determination is made to hold the job and notify the tester of the failure, the process passes to block 822 which illustrates holding the job and notifying the tester. Next, block 824 depicts a determination of whether or not the user has terminated this test process. If a determination is made that the user terminated the test process, the process passes to block 826 which illustrates the work flow manager executing the termination phase, i.e. the "DUT TERM" phase, for the device-under test (DUT) test machine. The "DUT TERM" phase is executed after the currently executing processes have been terminated, either by the work flow manager or by the tester. Referring again to block 824, if a determination is made that the user did not terminate the test process, the process passes to block 810.

Referring again to block 820, if a determination is made not to hold the job and notify the tester, the process passes to block 828 which illustrates a determination of whether or not to terminate the job. If a determination is made to terminate the job, the process passes to block 830 which depicts terminating the job and notifying the tester. The process then passes to block 826.

Referring again to block 828, if a determination is made not to terminate the job, the process passes to block 832 which illustrates executing a custom routine. The process then passes back to block 810.

Figure 9:
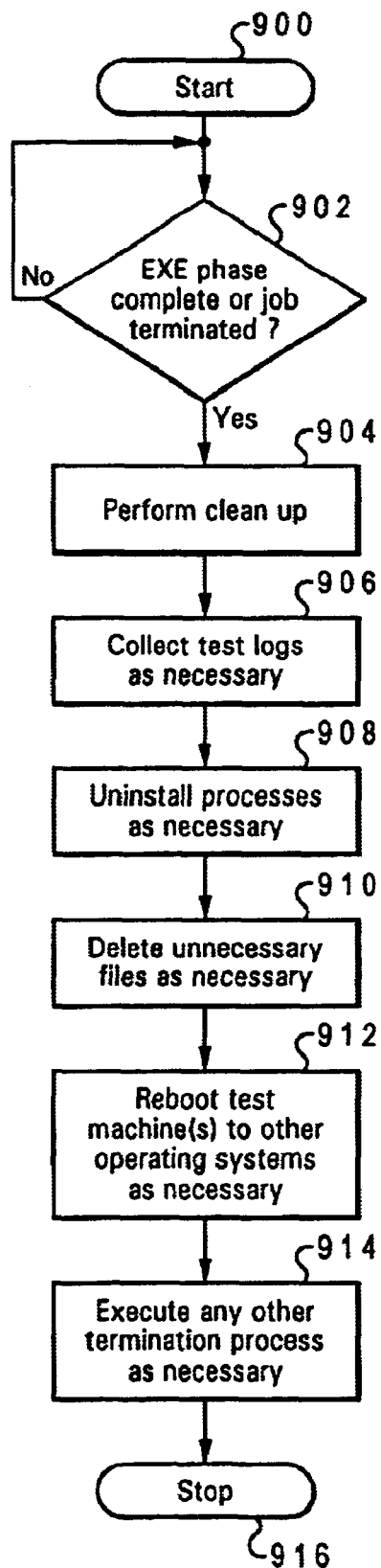
FIG. 9 depicts a high level flow chart which illustrates a termination phase of an automated software test environment in accordance with the present invention.

FIG. 9 illustrates a high level flow chart which depicts a termination phase of an automated software test environment in accordance with the present invention. The process starts as depicted by block 900 and thereafter passes to block 902 which illustrates a determination of whether or not the execution test phase has completed or the job was terminated. If a determination is made that either the execution test phase has not completed or the job has not terminated, the process passes back to block 902. Referring again to block 902, if a determination is made that either the execution test phase has completed or the job was terminated, the process passes to block 904 which depicts the work flow manager performing clean-up processes. Next, block 906 depicts the work flow manager collecting test logs as necessary. Block 908, then, illustrates the work flow manager uninstalling processes from test machines as necessary. The process then passes to block 910 which depicts the work flow manager deleting all unnecessary files from the test machines. Thereafter, block 912 illustrates the work flow manager re-booting the test machines to other operating systems as necessary. Next, block 914 depicts the execution of any other termination process. The process then terminates as depicted by block 916.

Figure 10:
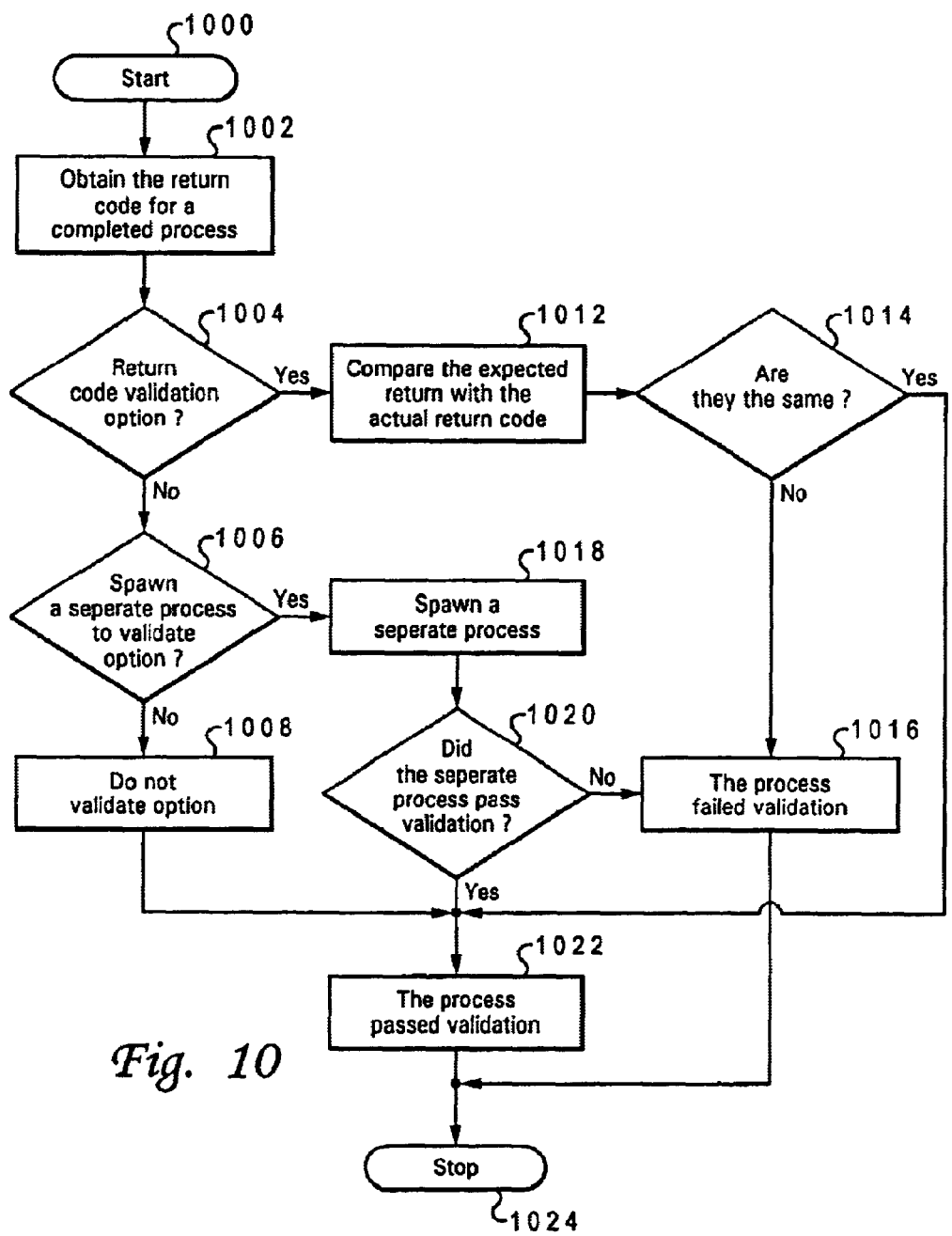
FIG. 10 illustrates a high level flow chart which depicts a validation procedure for all processes executed within an automated software test environment in accordance with the present invention.

FIG. 10 depicts a high level flow chart which illustrates a validation procedure for all processes executed within an automated software test environment in accordance with the present invention. The process starts as depicted by block 1000 and thereafter passes to block 1002 which illustrates obtaining the return code for a process which has completed execution. Next, block 1004 illustrates a determination of whether or not the return code validation procedure should be executed. If a determination is made that the return code validation procedure should not be executed, the process passes to block 1006 which depicts a determination of whether or not a separate validation process should be spawned. If a determination is made that a separate validation process should not be spawned, the process passes to block 1008 which depicts a selection of a do-not-validate option. Therefore, the process will not be validated. The process passes to block 1022 which illustrates the process passing validation. The process then terminates as depicted by block 1024.

Referring again to block 1004, if a determination is made that the return code validation procedure should be executed, the process passes to block 1012 which depicts a comparison of the expected return code with the actual return code. Next, block 1014 illustrates a determination of whether or not the expected and actual return codes are the same. If a determination is made that the expected and actual return codes are not the same, the process passes to block 1016 which depicts a determination that the process failed the validation process. Referring again to block 1014, if a determination is made that the expected and actual return codes are the same, the process passes to block 1022 which depicts a determination that the process passed the validation process. The process then terminates as illustrated by block 1024.

Referring again to block 1006, if a determination is made that a separate process should be spawned, the process passes to block 1018 which depicts spawning a new process. The spawned process itself will be validated utilizing the process described by FIG. 10. Next, block 1020 illustrates a determination of whether or not the process passed validation utilizing the spawned process. If a determination is made that the process did not pass validation using the spawned process, the process passes to block 1016 which depicts a determination that the process failed the validation process. The process then terminates as illustrated by block 1024. Referring again to block 1020, if a determination is made that the process did pass validation using the spawned process, the process passes to block 1022 which depicts a determination that the process passed the validation process.

FIG. 11 depicts pseudo-code which provides an example of the execution of processes in serial, in parallel, and in a combination of serial and parallel processes in accordance with the present invention.

FIG. 12 illustrates an execution time line depicting the execution of the processes of FIG. 11 in accordance with the present invention.

A process for installing an operating system "INSTALLOS" is first started. Then, a process group is executed. A process group is a grouping of processes and/or other process groups. Process groups also include execution information that indicates whether to run the group in parallel or series.

The INSTALLOS process executes and completes first, and then the RUNTESTS process group executes. The RUNTESTS process group includes the RUNXYZTEST process and the RUNABC process group. The RUNXYZTEST process and the RUNABC process group are executed in parallel.

The RUNABC process group includes two processes which are the RUNABCTEST and the CLEANUPABCFILES processes. The RUNABCTEST and the CLEANUPABCFILES processes are executed in series. Once all of the RUNTESTS group's processes complete execution, the COLLECTLOGS process is executed.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system including an automated software test environment for automatically testing a software application, said method comprising the steps of:
    establishing a work flow manager for automatically managing said automated software test environment, said automated software test environment including a plurality of computer systems coupled to a server computer system utilizing a network, said work flow manager being executed utilizing said server computer system;
    establishing a plurality of ordered test phases to be executed in a specified order including at least an initialization test phase for preparing said test environment for testing said software application said initialization test phase capable of being executed prior to an availability of said software application;
    transmitting an event to said work flow manager utilizing one of said plurality of computer systems to start execution of selected ones of said plurality of ordered test phases; and
    controlling execution of said selected ones of said plurality of ordered test phases utilizing said work flow manager in response to a receipt of events.

2. The method according to claim 1, further comprising the step of executing an initialization test phase utilizing said work flow manager in response to a receipt of a build event by said server computer system, said build event being generated by one of said plurality of computer systems utilized to build said software application.

3. The method according to clam 1, further comprising the steps of:
    said step of establishing a plurality of ordered test phases further comprising the step of establishing a plurality of ordered test phases including an execution test phase for executing a plurality of tests on said software application; and executing a first plurality of said plurality of tests in series.

4. The method according to claim 1, further comprising the steps of:

said step of establishing a plurality of ordered test phases further comprising the step of establishing a plurality of ordered test phases including an execution test phase for executing a plurality of tests on said software application; and executing a second plurality of said plurality of tests in parallel.

5. The method according to claim 1, further comprising the steps of:

said step of establishing a plurality of ordered test phases further comprising the step of establishing a plurality of ordered test phases including an execution test phase for executing a plurality of tests on said software application;

executing a first plurality of said plurality of tests in series; and executing said first plurality of said plurality of tests in parallel with a fourth plurality of said plurality of tests.

6. The method according to claim 1, further comprising the step of receiving a job description utilizing said work flow manager, said job description including an identification of said software application and an identification of a plurality of tests to be executed on said software application.

7. The method according to claim 1, wherein the step of establishing a plurality of ordered test phases further comprises the step of establishing an installation test phase for installing test processes and said software application on said plurality of computer systems.

8. The method according to claim 7, wherein said step of establishing an installation test phase further comprises the step of establishing an installation test phase including the step of installing a plurality of test cases on one of said plurality of computer systems.

9. The method according to claim 7, wherein said step of establishing an installation test phase further comprises the step of installing an operating system required to execute one of said plurality of tests on one of said plurality of computer systems.

10. The method according to claim 7, wherein said step of establishing an installation test phase further comprises the step of installing a plurality of test tools required to execute one of said plurality of tests on one of said plurality of computer systems.

11. The method according to claim 1, wherein the step of establishing a plurality of ordered test phases further comprises the steps of:

establishing an execution test phase for executing a plurality of tests on said software application; and establishing a termination test phase for terminating said execution of said tests.

12. The method according to claim 11, wherein said step of establishing an execution test phase further comprises the step of establishing an execution test phase including the step of executing said plurality of tests.

13. The method according to claim 11, wherein said step of establishing a termination test phase further comprises the step of establishing a termination test phase including the step of resetting said automated test environment to an original state.

14. The method according to claim 1, further comprising the step of specifying an order for executing said plurality of ordered test phases including specifying completing execution of an initialization test phase prior to executing an installation test phase, completing execution of said installation test phase prior to executing an execution test phase, and completing execution of said execution test phase prior to executing a termination test phase.

15. The method according to claim 1, further comprising the step of during said initialization test phase prior to said software application being available, preparing said automated test environment to execute said plurality of tests.

16. The method according to claim 1, further comprising the step of generating an initialization event in response to a completion of building said software.

17. The method according to claim 1, wherein said step of prior to said availability of said software application, preparing said automated test environment to execute said plurality of tests further comprises the step of determining an availability of one of said plurality of computer system to be utilized to execute one of said plurality of tests.

18. The method according to claim 1, wherein said step of establish an initialization test phase further comprises the step of establishing an initialization test phase including the steps of:

executing initialization test phase processes;

building said software application; and copying said built software application to one of said plurality of computer systems, wherein said software application is available when said built software application is copied to one of said plurality of computer systems.

19. The method according to claim 18, further comprising the step of generating an installation event in response to a completion of said copying said built software application to one of said plurality of computer systems and a completion of initialization test phase processes.

20. The method according to claim 1, further comprising the step of establishing a validation procedure including the steps of:

suspending execution of said plurality of tests prior to a completion of said plurality of tests; and providing a notification of said suspension.

21. The method according to claim 1, further comprising the step of establishing a validation procedure including the steps of:

terminating execution of said plurality of tests prior to a completion of said plurality of tests; and providing a notification of said termination.

22. The method according to claim 1, further comprising the step of establishing a validation procedure including the steps of:

executing a process to determine a result of an execution of each said plurality of tests; and reporting said result.

23. The method according to claim 1, wherein said step of establishing a plurality of ordered test phases further comprises the step of establishing a plurality of ordered test phases, at least each of two of said plurality of order test phases being executed utilizing different ones of said plurality of computer systems.

24. A method in a data processing system including an automated software test environment for automatically testing a software application, said method comprising the steps of:

establishing an event-driven work flow manager for automatically managing said automated software test environment in response to a receipt of events, said automated software test environment including a plurality of computer systems coupled to a server computer system utilizing a network, said work flow manager being executed utilizing said server computer system;

executing a plurality of tests on said software application utilizing said plurality of computer systems being managed by said work flow manager;

in response to a completion of one of said plurality of tests, executing a validation procedure to validate a result of said one of said plurality of tests;

suspending execution of others of said plurality of tests being executed in response to a failure of said validation procedure to validate said result of said one of said plurality of tests; and providing a notification of said suspension of execution.

25. A method in a data processing system including an automated software test environment for automatically testing a software application, said method comprising the steps of:

establishing an event-driven work flow manager for automatically managing said automated software test environment in response to a receipt of events, said automated software test environment including a plurality of computer systems coupled to a server computer system utilizing a network, said work flow manager being executed utilizing said server computer system;

executing a plurality of tests on said software application utilizing said plurality of computer systems being managed by said work flow manager;

in response to a completion of one of said plurality of tests, executing a validation procedure to validate a result of said one of said plurality of tests;

terminating execution of others of said plurality of tests being executed in response to a failure of said validation procedure to validate said result of said one of said plurality of tests; and providing a notification of said termination of execution.

26. A method in a data processing system including an automated software test environment for automatically testing a software application, said method comprising the steps of:

establishing an event-driven work flow manager for automatically managing said automated software test environment in response to a receipt of events, said automated software test environment including a plurality of computer systems coupled to a server computer system utilizing a network, said work flow manager being executed utilizing said server computer system;

executing a plurality of tests on said software application utilizing said plurality of computer systems being managed by said work flow manager;

in response to a completion of one of said plurality of tests, executing a validation procedure to validate a result of said one of said plurality of tests;

spawning a new process in response to said execution of a validation procedure to determine a result of execution of said one of said plurality of tests; and reporting a result of said spawned new process, wherein said result of execution of said one of said plurality of tests is reported.

27. A data processing system including an automated software test environment for automatically testing a software application, said data processing system comprising:

means for establishing a work flow manager for automatically managing said automated software test environment, said automated software test environment including a plurality of computer systems coupled to a server computer system utilizing a network, said work flow manager being executed utilizing said server computer system;

means for establishing a plurality of ordered test phases to be executed in a specified order including at least an initialization test phase for preparing said test environment for testing said software application, said initialization test phase capable of being executed prior to an availability of said software application;

means for transmitting an event to said work flow manager utilizing one of said plurality of computer systems to start execution of selected ones of said plurality of ordered test phases; and means for controlling execution of said selected ones of said plurality of ordered test phases utilizing said work flow manager in response to a receipt of events.

28. The system according to claim 27, further comprising means for executing an initialization test phase utilizing said work flow manager in response to a receipt of a build event by said server computer system, said build event being generated by one of said plurality of computer systems utilized to build said software application.

29. The system according to claim 27, further comprising:

said means for establishing a plurality of ordered test phases further comprising means for establishing a plurality of ordered test phases including an execution test phase for executing a plurality of tests on said software application; and means for executing a first plurality of said plurality of tests in series.

30. The system according to claim 27, further comprising:

said means for establishing a plurality of ordered test phases further comprising means for establishing a plurality of ordered test phases including an execution test phase for executing a plurality of tests on said software application; and means for executing a second plurality of said plurality of tests in parallel.

31. The system according to claim 27, further comprising:

said means for establishing a plurality of ordered test phases further comprising means for establishing a plurality of ordered test phases including an execution test phase for executing a plurality of tests on said software application;

means for executing a first plurality of said plurality of tests in series; and means for executing said first plurality of said plurality of tests in parallel with a fourth plurality of said plurality of tests.

32. The system according to claim 27, further comprising means for receiving a job description utilizing said work flow manager, said job description including an identification of said software application and an identification of a plurality of tests to be executed on said software application.

33. The system according to claim 27, wherein said means for establishing a plurality of ordered test phases further comprises means for establishing an installation test phase for installing test processes and said software application on said plurality of computer systems.

34. The system according to claim 33, wherein said means for establishing an installation test phase further comprises means for establishing an installation test phase including means for installing a plurality of test cases on one of said plurality of computer systems.

35. The system according to claim 33, wherein said means for establishing an installation test phase further comprises means for installing an operating system required to execute one of said plurality of tests on one of said plurality of computer systems.

36. The system according to claim 33, wherein said means for establishing an installation test phase further comprises means for installing a plurality of test tools required to execute one of said plurality of tests on one of said plurality of computer systems.

37. The system according to claim 27, wherein said means for establishing a plurality of ordered test phases further comprises:
means for establishing an execution test phase for executing a plurality of tests on said software application; and
means for establishing a termination test phase for terminating said execution of said tests.

38. The system according to claim 37, wherein said means for establishing a execution test phase further comprises means for establishing an execution test phase including means for executing said plurality of tests.

39. The system according to claim 37, wherein said means for establishing a termination test phase further comprises means for establishing a termination test phase including means for resetting said automated test environment to an original state.

40. The system according to claim 27, further comprising means for specifying an order for executing said plurality of ordered test phases including specifying completing execution of an initialization test phase prior to executing an installation test phase, completing execution of said installation test phase prior to executing an execution test phase, and completing execution of said execution test phase prior to executing a termination test phase.

41. The system according to claim 27, further comprising means during said initialization test phase prior to said software application being available, for preparing said automated test environment to execute said plurality of tests.

42. The system according to claim 27, further comprising means for generating an initialization event in response to a completion of building said software application.

43. The system according to claim 27, wherein said means prior to said availability of said software application, for preparing said automated test environment to execute said plurality of tests further comprises means for determining an availability of one of said plurality of computer system to be utilized to execute one of said plurality of tests.

44. The system according to claim 27, wherein said means for establishing an initialization test phase further comprises means for establishing an initialization test phase including:
means for executing initialization test phase processes;
means for building said software application; and
means for copying said built software application to one of said plurality of computer systems, wherein said software application is available when said built software application is copied to one of said plurality of computer systems.

45. The system according to claim 44, further comprising means for generating an installation event in response to a completion of said copying said built software application to one of said plurality of computer systems and a completion of initialization test phase processes.

46. The system according to claim 27, further comprising means for establishing a validation procedure including:
means for suspending execution of said plurality of tests prior to a completion of said plurality of tests; and
means for providing a notification of said suspension.

47. The system according to claim 27, further comprising means for establishing a validation procedure including:

means for terminating execution of said plurality of tests prior to a completion of said plurality of tests; and
means for providing a notification of said termination.

48. The system according to claim 27, further comprising means for establishing a validation procedure including:
means for executing a process to determine a result of an execution of each said plurality of tests; and
means for reporting said result.

49. The system according to claim 27, wherein said means for establishing a plurality of ordered test phases further comprises means for establishing a plurality of ordered test phases, at least each of two of said plurality of order test phases being executed utilizing different ones of said plurality of computer systems.

50. A data processing system including an automated software test environment for automatically testing a software application, comprising:
means for establishing an event-driven work flow manager for automatically managing said automated software test environment in response to a receipt of events, said automated software test environment including a plural of computer systems coupled to a server computer system utilizing a network, said work flow manager being executed utilizing said server computer system;
means for executing a plurality of tests on said software application utilizing said plurality of computer systems being managed by said work flow manager;
means responsive to a completion of one of said plurality of tests, for executing a validation procedure to validate a result of said one of said plurality of tests;
means for suspending execution of others of said plurality of tests being executed in response to a failure of said validation procedure to validate said result of said one of said plurality of tests; and
means for providing a notification of said suspension of execution.

51. A data processing system including an automated software test environment for automatically testing a software application, comprising:
means for establishing an event-driven work flow manager for automatically managing said automated software test environment in response to a receipt of events, said automated software test environment including a plurality of computer systems coupled to a server computer system utilizing a network, said work flow manager being executed utilizing said server computer system;
means for executing a plurality of tests on said software application utilizing said plurality of computer systems being managed by said work flow manager;
means responsive to a completion of one of said plurality of tests, for executing a validation procedure to validate a result of said one of said plurality of tests;
means for terminating execution of others of said plurality of tests being executed in response to a failure of said validation procedure to validate said result of said one of said plurality of tests; and
means for providing a notification of said termination of execution.

52. A data processing system including an automated software test environment for automatically testing a software application, comprising:
means for establishing an event-driven work flow manager for automatically managing said automated software test environment in response to a receipt of events, said automated software test environment including a plurality of computer systems coupled to a server computer system utilizing a network, said work flow manager being executed utilizing said server computer system;

means for executing a plurality of tests on said software application utilizing said plurality of computer systems being managed by said work flow manager;

means responsive to a completion of one of said plurality of tests, for executing a validation procedure to validate a result of said one of said plurality of tests;

means for spawning a new process in response to said execution of a validation procedure to determine a result of execution of said one of said plurality of tests; and means for reporting a result of said spawned new process, wherein said result of execution of said one of said plurality of tests is reported.

53. An automated software test environment for automatically testing a software application, comprising:

computer readable memory;

instruction means within said computer readable memory for establishing a work flow manager for automatically managing said automated software test environment, said automated software test environment including a plurality of computer systems coupled to a server computer system utilizing a network, said work flow manager being executed utilizing said server computer system;

instruction means within said computer readable memory for establishing a plurality of ordered test phases to be executed in a specified order including at least an initialization test phase for preparing said test environment for testing said software application, said initialization test phase capable of being executed prior to an availability of said software application;

instruction means within said computer readable memory for transmitting an event to said work flow manager utilizing one of said plurality of computer systems to start execution of selected ones of said plurality of ordered test phases; and instruction means within said computer readable memory for controlling execution of said selected ones of said plurality of ordered test phases utilizing said work flow manager in response to a receipt of events.

54. The automated software test environment according to claim 53, further comprising instruction means within said computer readable memory for executing an initialization test phase utilizing said work flow manager in response to a receipt of a build event by said server computer system, said build event being generated by one of said plurality of computer systems utilized to build said software application.

55. The automated software test environment according to claim 53, further comprising:

said instruction means within said computer readable memory for establishing a plurality of ordered test phases further comprising instruction means within said computer readable memory for establishing a plurality of ordered test phases including an execution test phase for executing a plurality of tests on said software application; and instruction means within said computer readable memory for executing a first plurality of said plurality of tests in series.

56. The automated software test environment according to claim 53, further comprising:

said instruction means within said computer readable memory for establishing a plurality of ordered test phases further comprising instruction means within said computer readable memory for establishing a plurality of ordered test phases including an execution test phase for executing a plurality of tests on said software application; and instruction means within said computer readable memory for executing a second plurality of said plurality of tests in parallel.

57. The automated software test environment according to claim 53, further comprising:

said instruction means within said computer readable memory for establishing a plurality of ordered test phases further comprising instruction means within said computer readable memory for establishing a plurality of ordered test phases including an execution test phase for executing a plurality of tests on said software application;

instruction means within said computer readable memory for executing a first plurality of said plurality of tests in series; and instruction means within said computer readable memory for executing said first plurality of said plurality of tests in parallel with a fourth plurality of said plurality of tests.

58. The automated software test environment according to claim 53, further comprising instruction means within said computer readable memory for receiving a job description utilizing said work flow manager, said job description including an identification of said software application and an identification of a plurality of tests to be executed on said software application.

59. The automated software test environment according to claim 53, wherein said instruction means within said computer readable memory for establishing a plurality of ordered test phases further comprises instruction means within said computer readable memory for establishing an installation test phase for installing test processes and said software application on said plurality of computer systems.

60. The automated software test environment according to claim 59, wherein said instruction means within said computer readable memory for establishing an installation test phase further comprises instruction means for establishing an installation test phase including instruction means within said computer readable memory for installing a plurality of test cases on one of said plurality of computer systems.

61. The automated software test environment according to claim 59, wherein said instruction means within said computer readable memory for establishing an installation test phase further comprises instruction means within said computer readable memory for installing an operating system required to execute one of said plurality of tests on one of said plurality of computer systems.

62. The automated software test environment according to claim 59, wherein said instruction means within said computer readable memory for establishing an installation test phase further comprises instruction means within said computer readable memory for installing a plurality of test tools required to execute one of said plurality of tests on one of said plurality of computer systems.

63. The automated software test environment according to claim 53, wherein said instruction means within said computer readable memory for establishing a plurality of ordered test phases further comprises:

instruction means within said computer readable memory for establishing an execution test phase for executing a plurality of tests on said software application; and instruction means within said computer readable memory for establishing a termination test phase for terminating said execution of said tests.

64. The automated software test environment according to claim 63, wherein said instruction means within said computer readable memory for establishing an execution test phase further comprises instruction means within said computer readable memory for establishing an execution test phase including instruction means within said computer readable memory for execute said plurality of tests.

65. The automated software test environment according to claim 63, wherein said instruction means within said computer readable memory for establishing a termination test phase further comprises instruction means within said computer readable memory for establishing a termination test phase including instruction means within said computer readable memory for resetting said automated test environment to an original state.

66. The automated software test environment according to claim 53, further comprising instruction means within said computer readable memory for specifying an order for executing said plurality of ordered test phases including specifying completing execution of an initialization test phase prior to executing an installation test phase, completing execution of said installation test phase prior to executing an execution test phase, and completing execution of said execution test phase prior to executing a termination test phase.

67. The automated software test environment according to claim 53, further comprising instruction means within said computer readable memory during said initialization test phase prior to said software application being available, for preparing said automated test environment to execute said plurality of tests.

68. The automated software test environment according to claim 53, further comprising instruction means within said computer readable memory for generating an initialization event in response to a completion of building said software application.

69. The automated software test environment according to claim 53, wherein said instruction means within said computer readable memory prior to said availability of said software application, for preparing said automated test environment to execute said plurality of tests further comprises instruction means within said computer readable memory for determining an availability of one of said plurality of computer system to be utilized to execute one of said plurality of tests.

70. The automated software test environment according to claim 53, wherein said instruction means within said computer readable memory for establishing an initialization test phase further comprises instruction means within said computer readable memory for establishing an initialization test phase including:
  instruction means within said computer readable memory for executing initialization test phase processes;
  instruction means within said computer readable memory for building said software application; and
  instruction means within said computer readable memory for copying said built software application to one of said plurality of computer systems, wherein said software application is available when said built software application is copied to one of said plurality of computer systems.

71. The automated software test environment according to claim 70, further comprising instruction means within said computer readable memory for generating an installation event in response to a completion of said copying said built software application to one of said plurality of computer systems and a completion of initialization test phase processes.

72. The automated software test environment according to claim 53, further comprising instruction means within said computer readable memory for establishing a validation procedure including:
  instruction means within said computer readable memory for suspending execution of said plurality of tests prior to a completion of said plurality of tests; and
  instruction means within said computer readable memory for providing a notification of said suspension.

73. The automated software test environment according to claim 53, further comprising instruction means within said computer readable memory for establishing a validation procedure including:
  instruction means within said computer readable memory for terminating execution of said plurality of tests prior to a completion of said plurality of tests; and
  instruction means within said computer readable memory for providing a notification of said termination.

74. The automated software test environment according to claim 53, further comprising instruction means within said computer readable memory for establishing a validation procedure including:
  instruction means within said computer readable memory for executing a process to determine a result of an execution of each said plurality of tests; and
  instruction means within said computer readable memory for reporting said result.

75. The automated software test environment according to claim 53, wherein said instruction means within said computer readable memory for establishing a plurality of ordered test phases further comprises instruction means within said computer readable memory for establishing a plurality of ordered test phases, at least each of two of said plurality of order test phases being executed utilizing different ones of said plurality of computer systems.

76. An automated software test environment for automatically testing a software application, comprising:
  computer readable memory;
  instruction means within said computer readable memory for establishing an event-driven work flow manager for automatically managing said automated software test environment in response to a receipt of events, said automated software test environment including a plurality of computer systems coupled to a server computer system utilizing a network, said work flow manager being executed utilizing said server computer system;
  instruction means within said computer readable memory for executing a plurality of tests on said software application utilizing said plurality of computer systems being managed by said work flow manager;
  instruction means within said computer readable memory responsive to a completion of one of said plurality of tests, for executing a validation procedure to validate a result of said one of said plurality of tests;
  instruction means within said computer readable memory for suspending execution of others of said plurality of tests being executed in response to a failure of said validation procedure to validate said result of said one of said plurality of tests; and
  instruction means within said computer readable memory for providing a notification of said suspension of execution.

77. An automated software test environment for automatically testing a software application, comprising:

computer readable memory;

instruction means within said computer readable memory for establishing an event-driven work flow manager for automatically managing said automated software test environment in response to a receipt of events, said automated software test environment including a plurality of computer systems coupled to a server computer system utilizing a network, said work flow manager being executed utilizing said server computer system;

instruction means within said computer readable memory for executing a plurality of tests on said software application utilizing said plurality of computer systems being managed by said work flow manager;

instruction means within said computer readable memory responsive to a completion of one of said plurality of tests, for executing a validation procedure to validate a result of said one of said plurality of tests;

instruction means within said computer readable memory for terminating execution of others of said plurality of tests being executed in response to a failure of said validation procedure to validate said result of said one of said plurality of tests; and instruction means within said computer readable memory for providing a notification of said termination of execution.

78. An automated software test environment for automatically testing a software application, comprising:

computer readable memory;

instruction means within said computer readable memory for establishing an event-driven work flow manager for automatically managing said automated software test environment in response to a receipt of events, said automated software test environment including a plurality of computer systems coupled to a server computer system utilizing a network, said work flow manager being executed utilizing said server computer system;

instruction means within said computer readable memory for executing a plurality of tests on said software application utilizing said plurality of computer systems being managed by said work flow manager;

instruction means within said computer readable memory responsive to a completion of one of said plurality of tests, for executing a validation procedure to validate a result of said one of said plurality of tests;

instruction means within said computer readable memory for spawning a new process in response to said execution of a validation procedure to determine a result of execution of said one of said plurality of tests; and instruction means within said computer readable memory for reporting a result of said spawned new process, wherein said result of execution of said one of said plurality of tests is reported.

* * * * *